US011477707B2

(12) United States Patent
Paladugu et al.

(10) Patent No.: US 11,477,707 B2
(45) Date of Patent: Oct. 18, 2022

(54) CONDITIONAL PROCEDURES FOR ADDING AND CHANGING A SECONDARY NODE (SN) INITIATED BY A SN

(71) Applicant: QUALCOMM Incorporated, San Diego, CA (US)

(72) Inventors: Karthika Paladugu, San Diego, CA (US); Ozcan Ozturk, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/089,565

(22) Filed: Nov. 4, 2020

(65) Prior Publication Data

US 2021/0136638 A1 May 6, 2021

Related U.S. Application Data

(60) Provisional application No. 62/931,651, filed on Nov. 6, 2019.

(51) Int. Cl.
*H04W 36/00* (2009.01)
*H04W 76/27* (2018.01)
*H04W 84/18* (2009.01)

(52) U.S. Cl.
CPC ... *H04W 36/0061* (2013.01); *H04W 36/0058* (2018.08); *H04W 36/00835* (2018.08);
(Continued)

(58) Field of Classification Search
CPC ......... H04W 36/0061; H04W 36/0058; H04W 36/00835; H04W 36/00837; H04W 76/27;
(Continued)

(56) References Cited

U.S. PATENT DOCUMENTS

| 11,039,354 B2 * | 6/2021 | Yilmaz | H04W 36/0069 |
| 2015/0271713 A1 * | 9/2015 | Kim | H04W 72/04 |
| | | | 455/437 |

(Continued)

FOREIGN PATENT DOCUMENTS

| EP | 3589069 A1 | 1/2020 |
| WO | 2013064400 A1 | 5/2013 |

(Continued)

OTHER PUBLICATIONS

International Search Report and Written Opinion—PCT/US2020/059091—ISA/EPO—dated Feb. 18, 2021.

*Primary Examiner* — Hashim S Bhatti
(74) *Attorney, Agent, or Firm* — Patterson & Sheridan, L.L.P

(57) ABSTRACT

Aspects of the present disclosure relate to wireless communications, and more particularly, to procedures for supporting conditional new radio (NR) secondary node (SN) addition and change by using conditional handover (CHO) procedures. A method that may be performed by a user equipment (UE) includes receiving, from a master node (MN), configuration information, identifying a set of candidate cells for a conditional addition or change of a SN for a the UE based on execution criteria, detecting the execution criteria is met for one of the candidate cells, and taking action to add or change to the candidate cell as an SN based on the detection.

15 Claims, 13 Drawing Sheets

(52) U.S. Cl.
CPC ..... *H04W 36/00837* (2018.08); *H04W 76/27* (2018.02); *H04W 84/18* (2013.01)

(58) Field of Classification Search
CPC .. H04W 84/18; H04W 36/36; H04W 36/0069
See application file for complete search history.

(56) References Cited

U.S. PATENT DOCUMENTS

| | | | |
|---|---|---|---|
| 2018/0160336 A1* | 6/2018 | Dai | H04W 36/38 |
| 2020/0329415 A1* | 10/2020 | Li | H04W 36/08 |
| 2021/0099926 A1* | 4/2021 | Chen | H04W 36/36 |
| 2021/0120458 A1* | 4/2021 | Koskela | H04W 36/0016 |
| 2021/0144579 A1* | 5/2021 | Ke | H04W 76/30 |
| 2021/0168678 A1* | 6/2021 | Deenoo | H04W 36/00837 |

FOREIGN PATENT DOCUMENTS

| | | |
|---|---|---|
| WO | 2018182240 A1 | 10/2018 |
| WO | 2019134163 A1 | 7/2019 |

\* cited by examiner

CONDITIONAL PROCEDURES FOR ADDING AND CHANGING A SECONDARY NODE (SN) INITIATED BY A SN

CROSS-REFERENCE TO RELATED APPLICATION(S)

This application claims benefit of and priority to U.S. Provisional Application No. 62/931,651, filed Nov. 6, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly to procedures for supporting conditional new radio (NR) secondary node (SN) addition and change by reusing conditional handover (CHO) procedures.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In LTE or LTE-A network, a set of one or more BSs may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNodeB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation (CA).

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects relate to a method for wireless communications by a secondary node (SN). The method generally includes identifying a set of one or more candidate cells for a conditional addition or change as an SN for a user equipment (UE) based on execution criteria and signaling information regarding the set of candidate cells to a master node (MN).

Certain aspects relate to a method for wireless communications by a MN. The method generally includes receiving, from a SN, signaling identifying a set of candidate cells for a conditional addition or change as a SN for a UE based on execution criteria and signaling configuration information regarding the set of candidate cells to the UE.

Certain aspects relate to a method for wireless communications by a UE. The method generally includes receiving, from a MN, configuration information identifying a set of candidate cells and execution criteria for a conditional addition or change as a SN for a UE, wherein the execution criteria is obtained from the MN in a transparent container, detecting the execution criteria is met for one of the candidate cells, and taking action to add or change to the candidate cell as an SN based on the detection.

Certain aspects relate to an apparatus for wireless communication by a SN, comprising a memory and at least one processor coupled to the memory, the least one processor being configured to identify a set of one or more candidate cells for a conditional addition or change of a SN for a UE based on execution criteria and signal information regarding the set of candidate cells to a MN.

Certain aspects relate to an apparatus for wireless communication by a MN, comprising a memory and at least one processor coupled to the memory, the least one processor being configured to receive, from a SN, signaling identifying a set of candidate cells for a conditional addition or change of a SN for a UE based on execution criteria and signal configuration information regarding the set of candidate cells to the UE.

Certain aspects relate to an apparatus for wireless communication by a UE, comprising a memory and at least one processor coupled to the memory, the least one processor being configured to receive, from a MN, configuration information identifying a set of candidate cells and execution criteria for a conditional addition or change of a SN for the UE, detect the execution criteria is met for one of the candidate cells, and take action to add or change to the candidate cell as an SN based on the detection.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
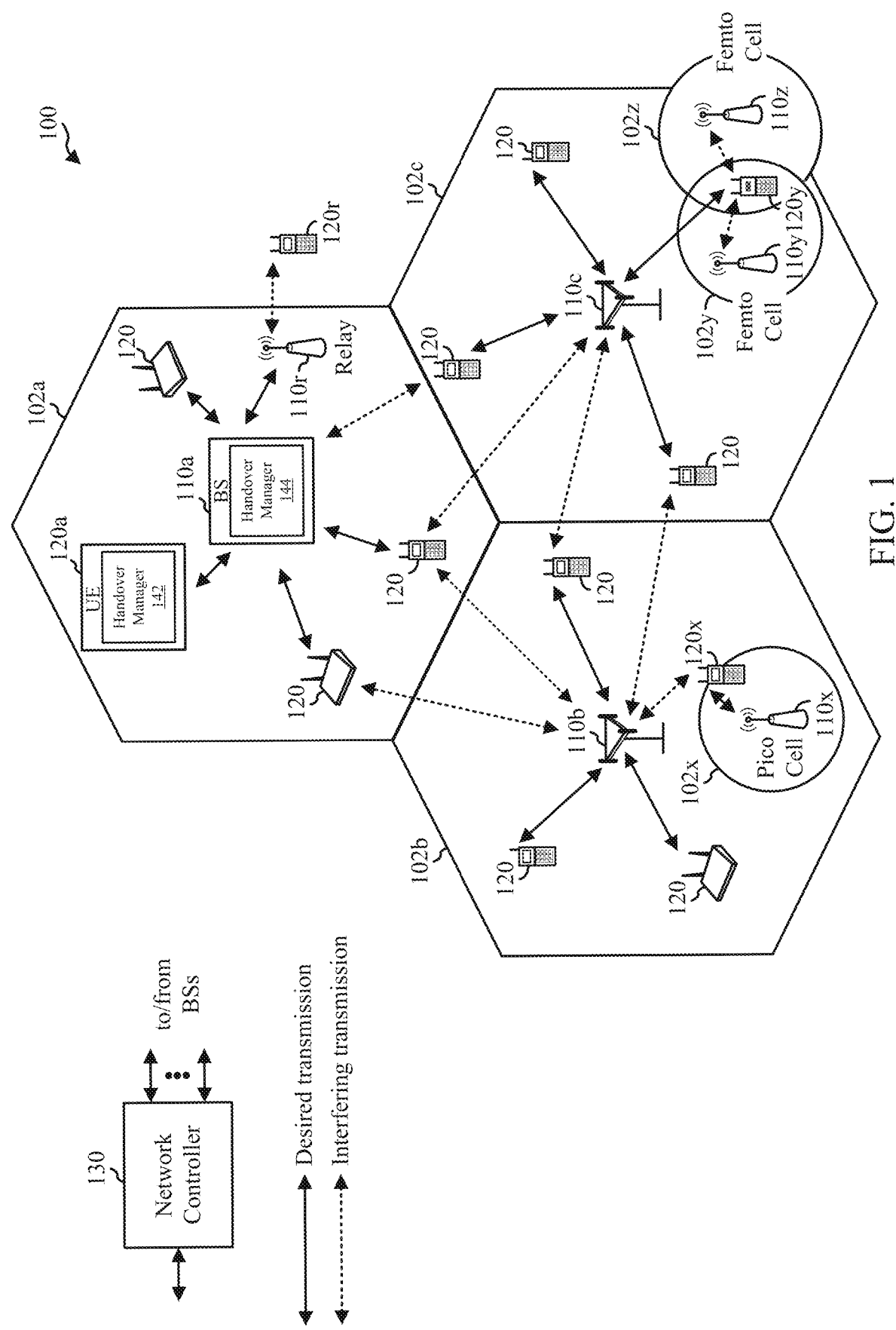
FIG. 1 is a block diagram conceptually illustrating an example telecommunications system, in accordance with certain aspects of the present disclosure.

Aspects of the present disclosure provide apparatus, methods, processing systems, and computer readable mediums for supporting conditional (e.g., new radio (NR)) secondary node (SN) addition and change by reusing conditional handover (CHO) procedures.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless communication network 100 may be a new radio (NR) system (e.g., a 5G NR network). For example, as shown in FIG. 1, a user equipment (UE) 120a includes a handover manager 142 that may be configured for receiving configuration information identifying a set of candidate cells for a conditional addition or change of a secondary node (SN) for the UE based on execution criteria. The handover manager 142 may also be configured to detect whether the execution criteria is met for one of the candidate cells. If the execution criteria is met for one of the candidate cells, the handover manager 142 may also be configured to perform the conditional addition or change to the candidate cell as the SN based on the detection.

Similarly, the base station (BS) 110a has a handover manager 144 that may be configured for handover operations. For example, if the BS 110a acts as a SN, the handover manager 144 may be configured to identify a set of candidate cells for a conditional addition or change of a SN for a UE based on execution criteria. The handover manager 144 may also be configured to signal configuration information regarding the set of candidate cells to a master node (MN). In another example, if the BS 110a acts as a MN, the handover manager 144 may be configured to receive signaling, from a SN, identifying a set of candidate cells for a conditional addition or change of a SN for a UE based on the execution criteria. The handover manager 144 may also be configured to signal configuration information regarding the set of candidate cells to a UE.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink (UL) and downlink (DL) and include support for half-duplex operation using time-division duplexing (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a radio access network (RAN) may include a central unit (CU) and a distributed unit (DU). A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation (CA) or dual connectivity, but not used for initial access, cell selection/reselection, or handover. In some cases DCells may not transmit synchronization signals—in some case cases DCells may transmit synchronization signaling (SS). NR BSs may transmit DL signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
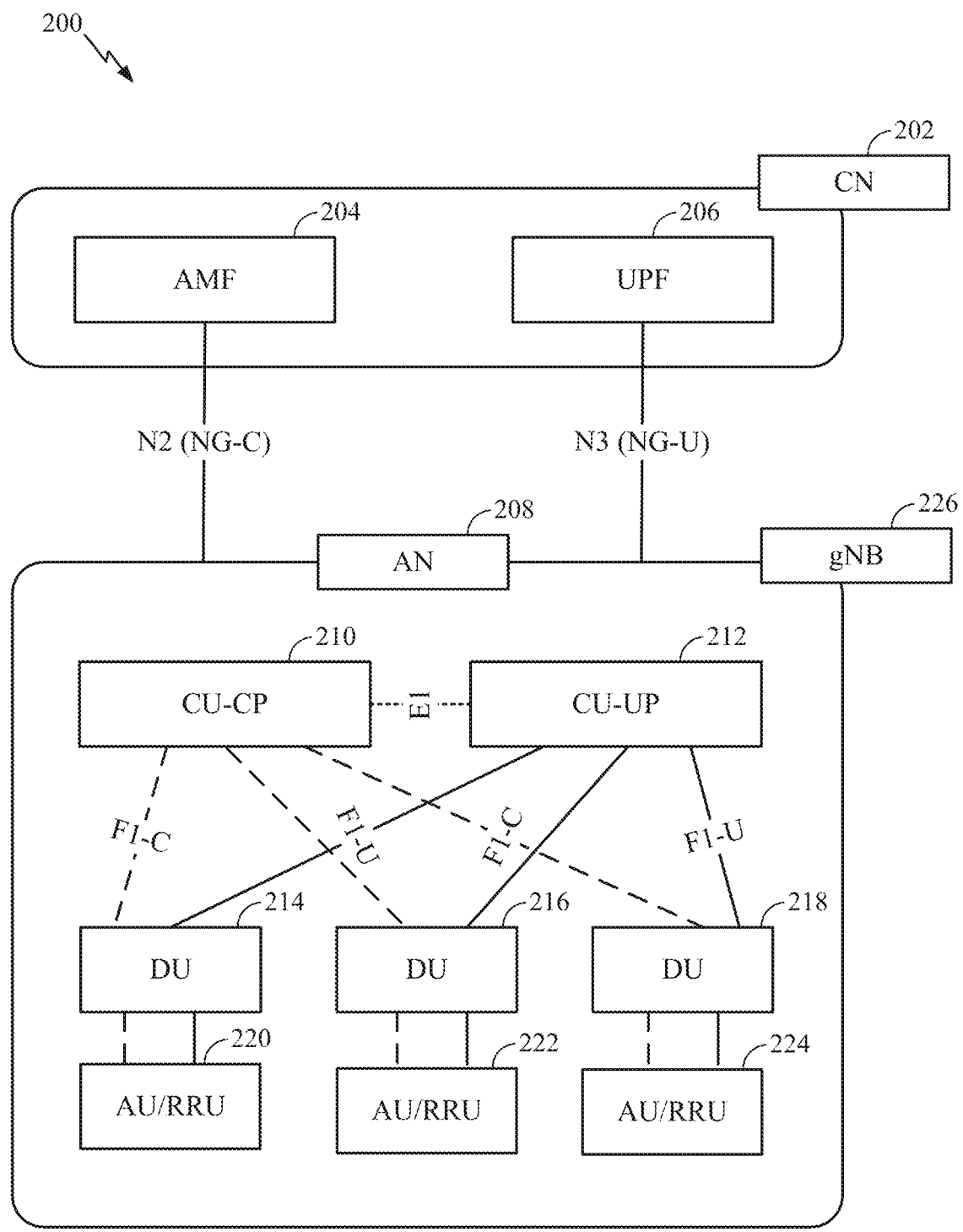
FIG. 2 is a block diagram illustrating an example architecture of a distributed radio access network (RAN), in accordance with certain aspects of the present disclosure.

FIG. 2 illustrates an example architecture of a distributed RAN 200, which may be implemented in the wireless communication network 100 illustrated in FIG. 1. As shown in FIG. 2, the distributed RAN includes core network (CN) 202 and access node 208 (e.g., BS 110a of FIG. 1).

The CN 202 may host core network functions. CN 202 may be centrally deployed. CN 202 functionality may be offloaded (e.g., to advanced wireless services (AWS)), in an effort to handle peak capacity. The CN 202 may include the Access and mobility management function (AMF) 204 and user plane function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more DUs 214-218, and one or more antenna/remote radio units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs/BSs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE 120a). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using bearer context management functions. Data forwarding between CU-UP(s) 212 may be via an Xn-U interface.

The distributed RAN 200 may support front-hauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common front-haul for LTE and NR. The distributed RAN 200 may enable cooperation between and among DUs 214-218, for example, via the CU-CP 212. An inter-DU interface may not be used.

Figure 3:
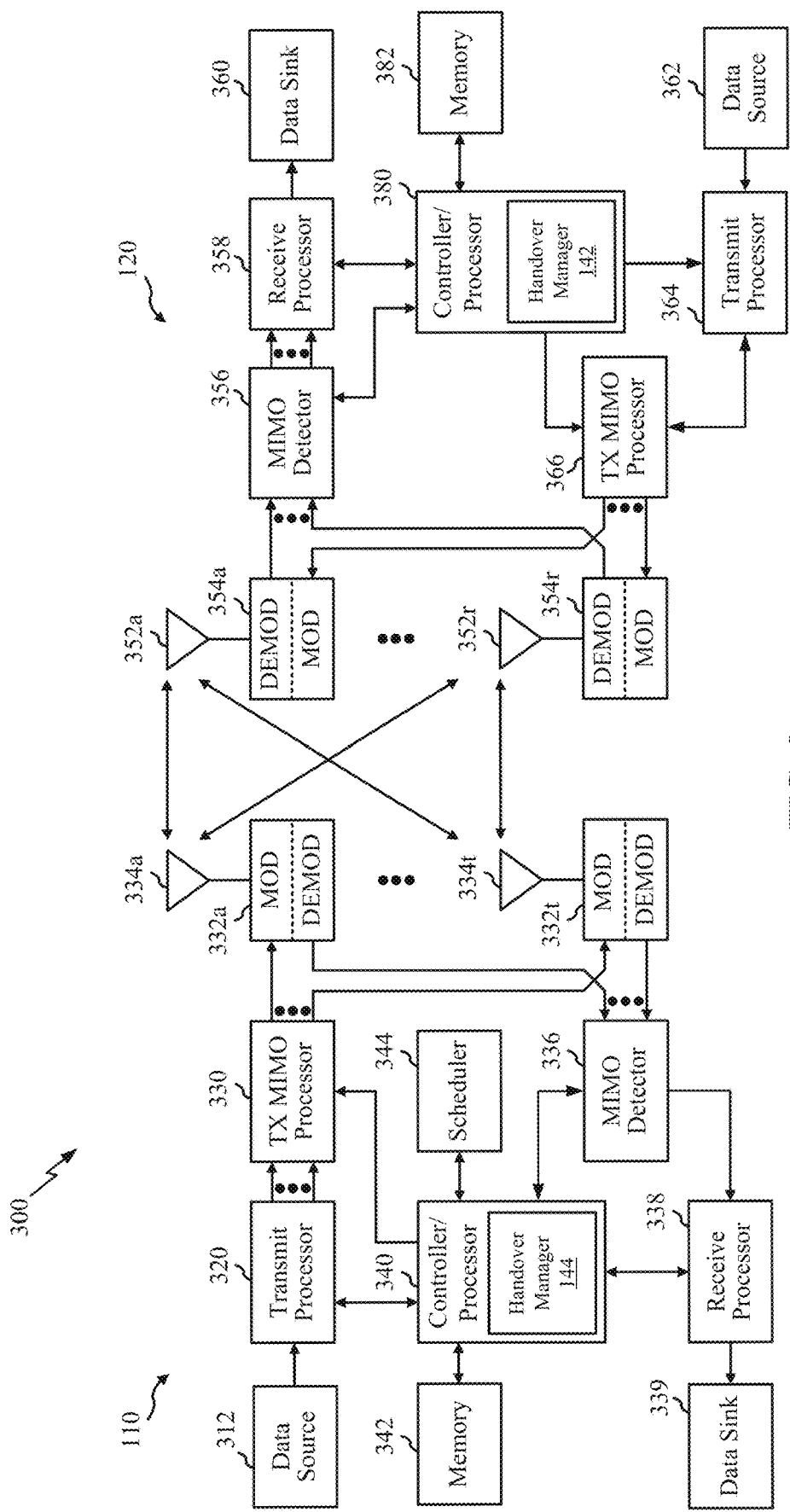
FIG. 3 is a block diagram conceptually illustrating a design of an example base station (BS) and user equipment (UE), in accordance with certain aspects of the present disclosure.

FIG. 3 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be BS of any other type illustrated in FIGS. 1 and 2, and the UE 120 may be a UE of any other type illustrated in FIG. 1. The BS 110 may be equipped with antennas 334a through 334t, processors 320, 330, 338, and/or controller/processor 340 of the BS 110 may be used to perform the various techniques and methods described herein. For example, as shown in FIG. 3, the controller/processor 340 of the BS 110 includes a handover manager 144 that may be configured for handover operations. For example, if the BS 110 acts as a SN, the handover manager 144 may be configured to identify a set of candidate cells for a conditional addition or change of a SN for a UE based on execution criteria. The handover manager 144 may also be configured to signal configuration information regarding the set of candidate cells to a MN. In another example, if the BS 110a acts as a MN, the handover manager 144 may be configured to receive signaling, from a SN, identifying a set of candidate cells for a conditional addition or change of a SN for a UE based on the execution criteria. The handover manager 144 may also be configured to signal configuration information regarding the set of candidate cells to a UE.

Similarly, the UE 120 includes a processor 380 that includes a handover manager 142 that may be configured for receiving configuration information identifying a set of candidate cells for a conditional addition or change of a secondary node (SN) for the UE based on execution criteria. The handover manager 142 may also be configured to detect whether the execution criteria is met for one of the candidate cells. If the execution criteria is met for one of the candidate cells, the handover manager 142 may also be configured to perform the conditional addition or change to the candidate cell as the SN based on the detection.

At the BS 110, a transmit processor 320 may receive data from a data source 312 and control information from a controller/processor 340. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 320 may process (e.g., encode and symbol map) the data and control information to obtain data symbols and control symbols, respectively. The processor 320 may also generate reference symbols, e.g., for the primary synchronization signaling (PSS), secondary synchronization signaling (SSS), and cell-specific reference signal (CRS). A transmit (TX) MIMO processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. DL signals from modulators 332a through 332t may be transmitted via the antennas 334a through 334t, respectively.

At the UE 120, the antennas 352a through 352r may receive the downlink signals from the BS 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the UL, at the UE 120, a transmit processor 364 may receive and process data (e.g., for the Physical Uplink Shared Channel (PUSCH)) from a data source 362 and control information (e.g., for the Physical Uplink Control Channel (PUCCH)) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the BS 110. At the BS 110, the UL signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The memories 342 and 382 may store data and program codes for BS 110 and UE 120, respectively. A scheduler 344 may schedule UEs for data transmission on the DL and/or UL. The processor 340 and/or other processors and modules at the BS 110 may perform or direct, e.g., the execution of various processes for the techniques described herein, e.g., the execution of the functional blocks illustrated in FIGS. 6 and 7. The processor 380 and/or other processors and modules at the UE 120 may also perform or direct, e.g., the execution of the functional blocks illustrated in FIG. 8.

Example Handover Scenarios

Some techniques and apparatuses described herein provide for low-latency or zero-latency handover from a source base station (BS) to a target BS (e.g., in a network such as a 4G/LTE or 5G/NR network). For example, some techniques and apparatuses described herein provide for configuration of the handover using a first protocol stack of the user equipment (UE) and a second protocol stack of the UE, wherein the first protocol stack is used for communication with the first BS and the second protocol stack is used for communication with the second BS. The use of the two protocol stacks may enable configuration of handover with regard to the target BS to be performed while communication with the source BS is ongoing. Thus, a latency associated with handing over the UE from the source BS to the target BS is reduced. Furthermore, some techniques and apparatuses described herein may provide for buffering and backhauling of UE traffic between the source BS and the target BS such that a flow of traffic to the UE is not interrupted (or so that interruption is reduced or minimized), thereby further reducing latency associated with handing over the UE. In this way, service levels at the UE may be satisfied in the case of handover of the UE, which allows for satisfaction of performance requirements for certain types of traffic (e.g., gaming traffic, multimedia traffic, high-reliability traffic, low-latency traffic, etc.).

Furthermore, some techniques and apparatuses described herein may provide a common packet data convergence protocol (PDCP) function for the make-before-break (MBB) handover procedure, which may streamline security key management, ciphering/deciphering, integrity protection, integrity verification, data unit reordering/duplicate discarding, link selection logic, and/or the like. Some techniques and apparatuses described herein provide control-plane (e.g., BS, network controller, control entity, etc.) messaging and handling to support the MBB handover. Some techniques and apparatuses described herein provide for an MBB handover using a carrier aggregation (CA) multiple-input multiple-output (MIMO) technique, wherein a diminished MIMO configuration is signaled to cause at least one antenna to be available for use for the MBB handover. Still further, some techniques and apparatuses described herein provide a role switch-based MBB handover technique, wherein a master cell group of the UE is switched from the source base station to the target base station while connections with the source base station and the target base station are active. In this way, low-latency or zero-latency handover (and the benefits described above in connection with low-latency or zero-latency handover) are realized.

Figure 4:
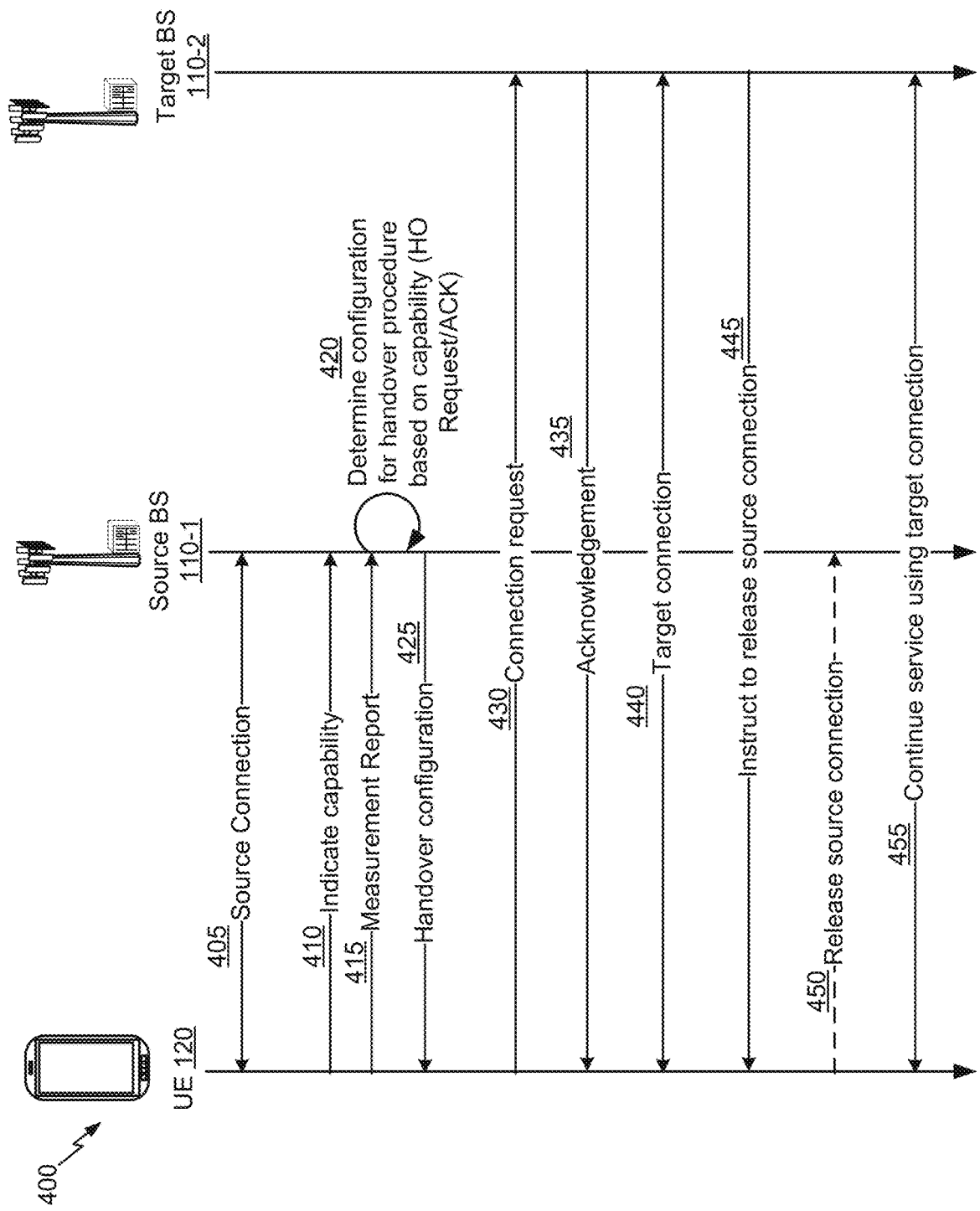
FIGS. 4 and 5 illustrate call flow diagram examples of determining a handover (HO) configuration for a HO procedure of a RAN, in accordance with certain aspects of the present disclosure.

FIG. 4 is a call flow diagram illustrating an example 400 of determining a handover configuration for a handover procedure of a radio access network (RAN), in accordance with various aspects of the present disclosure. As shown in FIG. 4, UE 120 is handed over from a source BS 110-1 to a target BS 110-2. The UE 120 may be implemented by any UE of FIG. 1 (e.g., UE 120a), and source BS 110-1 and target BS 110-2 may be implemented by any BS 110 of FIG. 1 (e.g., BS 110a) or FIG. 2 (e.g., AN 208), a DU 214-248 of FIG. 4, ora TRP hosted by a DU 214-218 of FIG. 4. The handover described in connection with FIG. 4 may be intra-frequency or inter-frequency and/or may be intra-CU or inter-CU.

As shown in FIG. 4 at 405, UE 120 may establish a wireless communication connection with source the BS 110-1 (hereinafter referred to as a source connection). At 410, the UE 120 may indicate a capability of UE 120 to any one or more of source BS 110-1, target BS 110-2, or another network entity such as an AMF (e.g., AMF 204 of FIG. 2), UPF (e.g., UPF 206 of FIG. 2), or any other CN function. For example, at 410, UE 120 may indicate that UE 120 has a simultaneous transmit and receive capability and/or a dual connectivity capability.

At 415, UE 120 may provide a measurement report to source BS 110-1. The measurement report may be generated by the UE 120, and may indicate to the source BS 110-1 that a handover is to be performed from the source BS 110-1 to the target BS 110-2. For example, the UE 120 may perform cell quality measurements (e.g., L3 cell quality measurements) to assess the quality of radio links between the UE 120 and one or more of the source BS 110-1 and the target BS 110-2. Accordingly, the measurement report may include the results of the cell quality measurements. In some examples, if the quality of the radio link between the UE 120 and the source BS 110-1 is sufficient to allow for successful UL communication of the measurement report, then successful receipt of the measurement report at the source BS 110-1 may indicate to the source BS 110-1 that a handover is to be performed from the source BS 110-1 to the target BS 110-2.

At 420 (assuming successful receipt of the measurement report at 415), the source BS 110-1 may determine a configuration for a handover procedure based at least in part on the capability indicated at step 2. For example, source BS 110-1 may provide a handover request to target BS 110-2, and may receive a handover acknowledgment (ACK) from target BS 110-2. In some aspects, source BS 110-1 may communicate with target BS 110-2 to determine a handover configuration for UE 120.

At 425, source BS 110-1 may provide the configuration for the handover procedure to the UE 120. For example, the handover configuration may include a configuration for a handover procedure that utilizes or does not utilize the indicated capability of the UE 120. In some aspects, the handover configuration may indicate that a make-before-break (MBB) handover procedure and/or a DC-based MBB handover procedure be performed. Thus, the configuration may indicate to the UE 120 whether to maintain the radio link connection to the source BS 110-1 while, and/or after, a radio link connection to the target BS 110-2 is established.

At 430, UE 120 requests to connect with target BS 110-2 (e.g., using the configuration received from source BS 110-1). For example, UE 120 may perform a random access procedure to establish a connection with target BS 110-2 (hereinafter referred to as a target connection).

In response, the target BS 110-2 may reply with an acknowledgment at 435. The UE 120 and target BS 110-2 may then establish the target connection, at 440. As is evident in the example 400 illustrated in FIG. 4, UE 120 may concurrently maintain both a source connection with source BS 110-1 and target BS 110-2 during the handover process. In such cases, because UE 120 maintains an active connection with both source BS 110-1 and target BS 110-2 for a period of time, UE 120 may experience decreased delays relative to previous techniques and/or minimal data interruption time (e.g., 0 ms handover).

At 445, the target BS 110-2 may instruct the UE 120 to release the source connection between the UE 120 and the source BS 110-1 to complete the handover. For example, once the UE 120 and/or target BS 110-2 determines that the target connection is sufficiently strong (e.g., a communication parameter measured by UE 120 and/or target BS 110-2 satisfies a first threshold indicative of a strong connection), target BS 110-2 may send the instruction to complete the handover.

In some aspects, the release of the source connection may not be based on an instruction from target BS 110-2. Instead, the UE 120 may release the source connection without instruction from target BS 110-2 based at least in part on the establishment of the target connection (e.g., the UE 120 determines that the communication parameter measured by the UE 120 satisfies the first threshold indicative of a strong target connection). In some aspects, the UE 120 may release the source connection based on an instruction from the source BS 110-1. In such an example, the instruction may be based at least in part on receiving, by the source BS 110-1, an indication of establishment of the target connection from the target BS 110-2 or from the UE 120.

At 450, the UE 120 may release the source connection to source BS 110-1. Additional communications, at 455, between the UE and the target BS 110-2, may be made using the target connection.

Accordingly, as shown by example 400 in FIG. 4, a UE may provide a capability to a BS or network entity and the BS may configure an MBB handover procedure for the UE to enable the UE to use the capability during the handover procedure. Therefore, a UE may achieve enhanced performance during a handover procedure and may experience minimal mobility interruption time (e.g., via a 0 ms handover) relative to a handover procedure that does not account for, or take advantage of the capability of the UE.

As indicated above, FIG. 4 is provided as an example. Other examples may differ from what is described with respect to FIG. 4.

Figure 5:
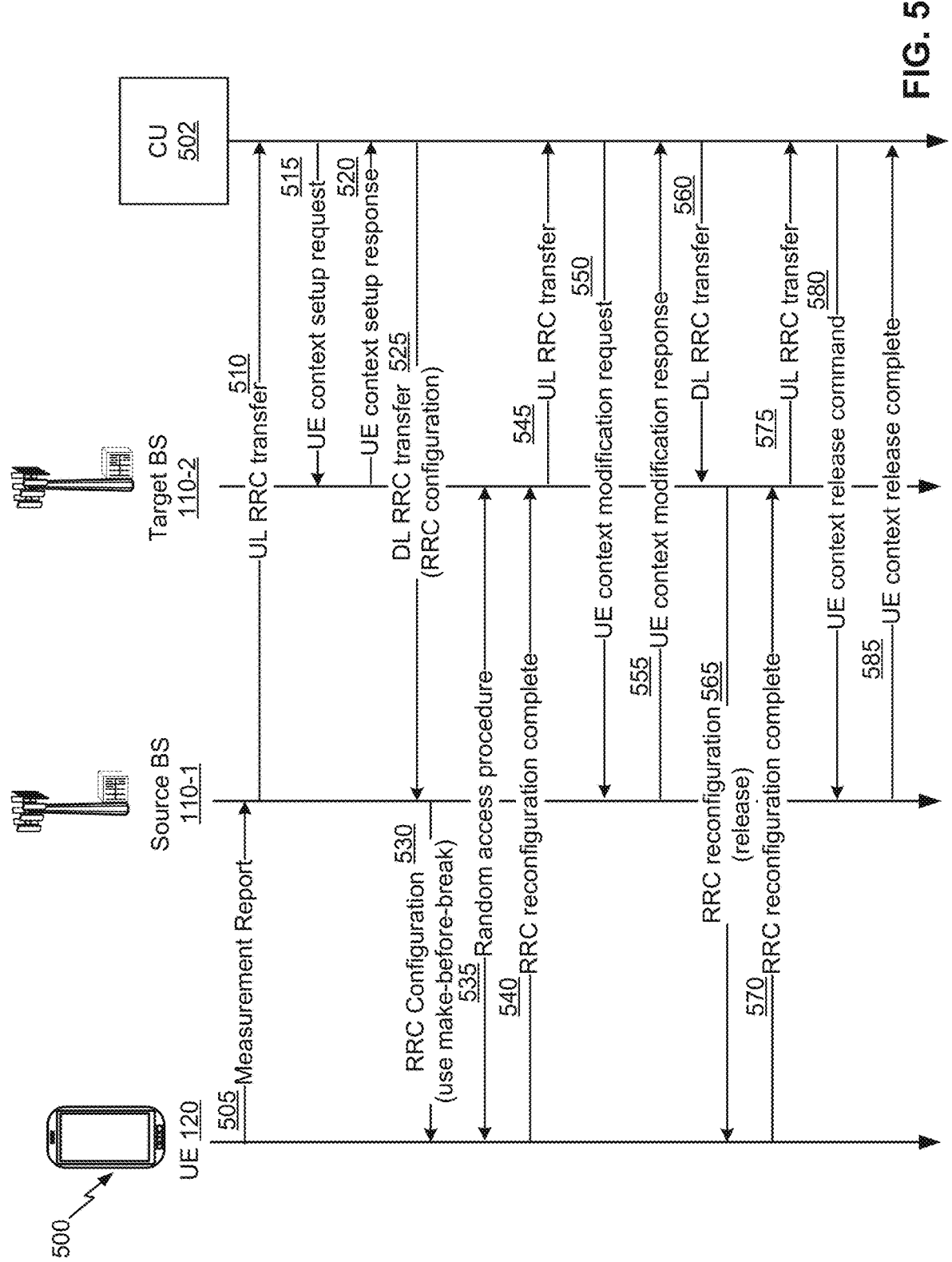

FIG. 5 is a call flow diagram illustrating an example 500 of determining a handover configuration for a handover procedure of a RAN, in accordance with various aspects of the present disclosure. More particularly, FIG. 5 illustrates an example intra-CU handover procedure using an enhanced MBB handover in which both a source BS 110-1 and a target BS 110-2 are associated with a same CU 502.

Prior to the beginning of the call flow, the UE 120 may exchange user data (e.g., UL user data from the UE 120 over PUSCH and/or DL user data received by the UE over PDSCH) with the CU 502 via source BS 110-1. At 505, the UE 120 may transmit a measurement report to the source BS 110-1.

The generation and transmission of the measurement report of FIG. 5 may include features of the measurement report described in FIG. 4. In some aspects, the UE 120 may generate and transmit the measurement report based at least in part on an event trigger (e.g., a signal measurement that satisfies a threshold) associated with determining that a handover procedure is to be initiated. For example, the execution criteria for conditional SN addition may involve inter-RAT measurement events configured to indicate whether one or more of: (i) a measured signal quality value of at least one inter-RAT neighbor is greater than a first threshold value (e.g., the signal is sufficiently strong), or (ii) a measured signal quality value of a PCell is less than the first threshold value, and the measured signal quality value of the at least one inter-RAT neighbor (e.g., another BS or PCell at the current BS) is greater than a second threshold value.

In some examples, the UE 120 may include a simultaneous transmit and receive capability (e.g., MBB capability) which allows UE 120 to concurrently transmit and receive data and/or information during a handover. In such a case, UE 120 may establish and maintain a plurality of connections with a plurality of different BSs (e.g., with source BS 110-1 and target BS 110-2).

At 510, source BS 110-1 may send an UL radio resource control (RRC) transfer to CU 502. In some aspects, the UL RRC transfer may include the measurement report. In an additional aspect, the UL RRC transfer may cause CU 502 to determine a handover configuration that is to be used for a handover procedure for UE 120. For example, CU 502 may select from possible handover procedures that may be performed by UE 120 based at least in part on the indicated capability of UE 120. In some aspects, CU 502 may select an enhanced MBB handover procedure for UE 120 based at least in part on the UE's 120 indication of a simultaneous transmit and receive capability.

At 515, the CU 502 may transmit a UE context setup request to target BS 110-2. In some examples, the CU 502 may transmit the UE context setup request, in part, to indicate to target BS 110-2 that UE 120 will be handed over to target BS 110-2 during a handover procedure.

At 520, target BS 110-2 may respond to the UE context setup request by transmitting a UE context setup response. The target BS 110-2 may send the UE context setup response to acknowledge the request and/or to indicate an ability to support the handover procedure and to serve the UE 120 after the handover procedure.

At 525, the CU 502 may transmit a DL RRC transfer to the source BS 110-1. In some aspects, the DL RRC transfer may include an RRC reconfiguration message that indicates a configuration for a handover procedure in which UE 120 is to be handed over from source BS 110-1 to target BS 110-2.

At 530, the source BS 110-1 sends an RRC reconfiguration to UE 120. In some aspects, the RRC reconfiguration may include information identifying target BS 110-2, information identifying a handover configuration, and/or any other suitable information. In some examples, the RRC reconfiguration may include information indicating that the UE 120 is to perform an enhanced MBB handover procedure with target BS 110-2 using a simultaneous transmit and receive capability of UE 120. In such a case, the UE 120 may determine that it is capable of maintaining a connection with source BS 110-1 while establishing a connection with target BS 110-2.

At 535, the UE 120 may perform a random access procedure with target BS 110-2 (e.g., to initiate and/or to establish a connection with target BS 110-2). In some aspects, UE 120 can continue to exchange user data (e.g., uplink user data and/or downlink user data) with CU 502 via source BS 110-1 during and after the random access procedure.

At 540, UE 120 may transmit an RRC reconfiguration complete message to target BS 110-2. In some aspects, UE 120 may use a dual protocol stack, which includes a source protocol stack for communicating with source BS 110-1 and a target protocol stack for communicating with target BS 110-2. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a common PDCP layer or entity. In some aspects, the UE 120 may use the target protocol stack for UL data transmissions.

At 545, target BS 110-2 may transmit a UL RRC transfer to CU 502. In some examples, the UL RRC transfer may indicate the RRC reconfiguration is complete. Accordingly, in some aspects, based at least in part on receiving the indication that the RRC reconfiguration is complete, CU 502 may determine a handover completion configuration. For example, when making a completion determination, CU 502 may utilize and/or configure one or more thresholds for one or more measurement parameters to perform a handover completion procedure (e.g., to release source BS 110-1). Furthermore, in some aspects, after the RRC reconfiguration is complete, UE 120 may perform uplink user/control plane duplication with source BS 110-1 and CU 502. For example, control plane data may be duplicated and shared between BS 110-1 and CU 502. Furthermore, in some aspects, after the CU 502 determines the RRC reconfiguration is complete, the CU 502 may send DL user data to the UE 120 via target BS 110-2, while also continuing to send DL user/control plane duplication to the UE 120 via source BS 110-1. Accordingly, UE 120 may achieve improved reliability when receiving the data on the downlink.

At 550, the CU 502 may transmit a UE context modification request to the source BS 110-1. The UE context modification request may include a transmission stop indicator to indicate that source BS 110-1 is to be released from serving UE 120 (e.g., release of a radio link between the source BS 110-1 and the UE 120). In some examples, the source BS 110-1 may provide a DL data delivery status to CU 502 indicating status of DL user/control plane duplication the source BS 110-1 is communicating to the UE 120.

At 555, source BS 110-1 may transmit a UE context modification response to CU 502. For example, the UE context modification response may include an acknowledgement that source BS 110-1 is to be released during the handover procedure and/or is to no longer serve UE 120.

At 560, the CU 502 may transmit a DL RRC transfer to the target BS 110-2. The DL RRC transfer may include an RRC reconfiguration message indicating that a handover procedure from the source BS 110-1 to the target BS 110-2 is to be performed.

At 565, the target BS 110-2 may transmit an RRC reconfiguration to UE 120. In some examples, the RRC reconfiguration message may indicate that UE 120 is to release a connection with the source BS 110-1. As such, UE 120 may release the connection with the source BS 110-1 based at least in part on receiving the RRC reconfiguration message. Furthermore, UE 120 may then begin exchanging uplink user data and downlink user data with CU 502 via target BS 110-2.

At 570, the UE 120 may transmit an RRC reconfiguration complete message to the target BS 110-2. The RRC reconfiguration complete message may indicate that UE 120 has released the connection with source BS 110-1.

At 575, the target BS 110-2 may transmit a UL RRC transfer to CU 502. In some aspects, the UL RRC transfer may be made in response to receiving the RRC reconfiguration complete message and may indicate that the RRC reconfiguration complete message was received from UE 120.

At 580, the CU 502 may then send a UE context release command to source BS 110-1 (e.g., so that source BS 110-1 does not continue to attempt to serve UE 120).

At 585, the source BS 110-1 may transmit a UE context release complete message to CU 502. The UE context release complete message may be an acknowledgement that source BS 110-1 is no longer in communication with and/or serving UE 120.

As indicated above, FIG. 5 is provided as an example. Other examples may differ from what is described with respect to FIG. 5.

Example Optimizations for Enhanced Handover (HO) Procedures Using Aspects of Conditional Handovers (CHOS)

Aspects of the present disclosure relate to wireless communications, and more particularly, to enhanced handover (HO) procedures configured to improve make-before-break (MBB) and conditional handover (CHO) procedures. In some cases, the optimization may support MBB and/or CHO procedures involving N2 signaling. In some cases, optimizations may include taking actions to prioritize handover procedures to target base stations (BSs) that may be able to utilize Xn connections.

N2 signaling generally refers to signaling via the physical N2 interface between the NG-RAN gNodeB (gNB) and an Access and Mobility Management Function (AMF) in the 5G Core (5GC) network, as well as the logical N1 interface between the user equipment (UE) and the AMF. N2 generally serves as the control plane interface between an access network (NG-RAN or non-3GPP wireless local area network (WLAN)) and the 5GC network. N2 is generally concerned with connection management, UE context and protocol data unit (PDU) session management, and UE mobility management. Xn signaling generally refers to signaling using the Xn interface that exists between base stations (e.g., between gNBs). Xn generally refers to the network interface between NG-RAN nodes.

The techniques presented herein may help provide optimizations to support MBB and CHO for inter-NG RAN handovers.

In certain cases of enhanced handover procedures, the source BS and target BS are connected via Xn, which offers a relatively low latency communication interface. In such cases, data forwarding may be communicated over Xn between these nodes. Thus, aspects of the present disclosure, may allow N2-based HO procedures to prioritize such nodes to take advantage of lower latency associated with Xn signaling.

Typically, CHO configurations are sent to a UE before an actual HO event. The source BS may prepare one or multiple candidate target cells for CHO. For each candidate target cell, the network (e.g., a source BS and/or a CN) configures the UE with information to allow the UE to connect to the target cell during a HO, and with conditions to trigger the HO to the target cell. When a HO condition is met, the UE initiates a random access procedure (RACH) with the target cell. In such cases, the UE does not need to send a measurement report or wait for RRC reconfiguration to execute HO.

As noted above, in CHO procedures defined for N2-based candidate cell preparations, the source BS may prepare and/or select the candidate cells based on measurement criteria alone. If some of the cells belong to a different AMF, there may be a benefit in optimizing the source BS and UE CHO execution logic to prioritize the cells using the same AMF. In some cases, data forwarding over N2 may benefit from optimizations regarding when to enable the data forwarding for MBB and/or CHO handover procedures.

Conditional Procedures for Adding and Changing a Secondary Node (SN) Initiated by a SN Aspects of the present disclosure provide techniques that may help to optimize/improve enhanced handover (HO) procedures, such as make-before-break (MBB) and conditional handover (CHO).

As discussed, CHO is a HO procedure in which a user equipment (UE) selects a target cell for HO from among the candidate target cells based on CHO execution criteria. As described herein, the CHO procedure may be implemented for secondary node (SN) addition or change procedures and may reduce the delays involved in SN addition or change in dual-connectivity scenarios.

For conditional primary secondary cell (PSCell) change, various scenarios for SN change may include mast node (MN) initiated SN change and SN-initiated SN change. As the name implies, in MN-initiated SN change, generally, the MN decides the execution criteria in addition to which PSCells may be configured as candidate PSCells, and performs an SN addition procedure with the candidate SNs. Alternatively, in SN-initiated SN change, generally the SN decides which PSCells may be configured as candidate PSCells, and performs an SN addition procedure with the candidate SNs. In some cases, SN-initiated SN change may involve the SN determining the execution criteria.

Figure 6:
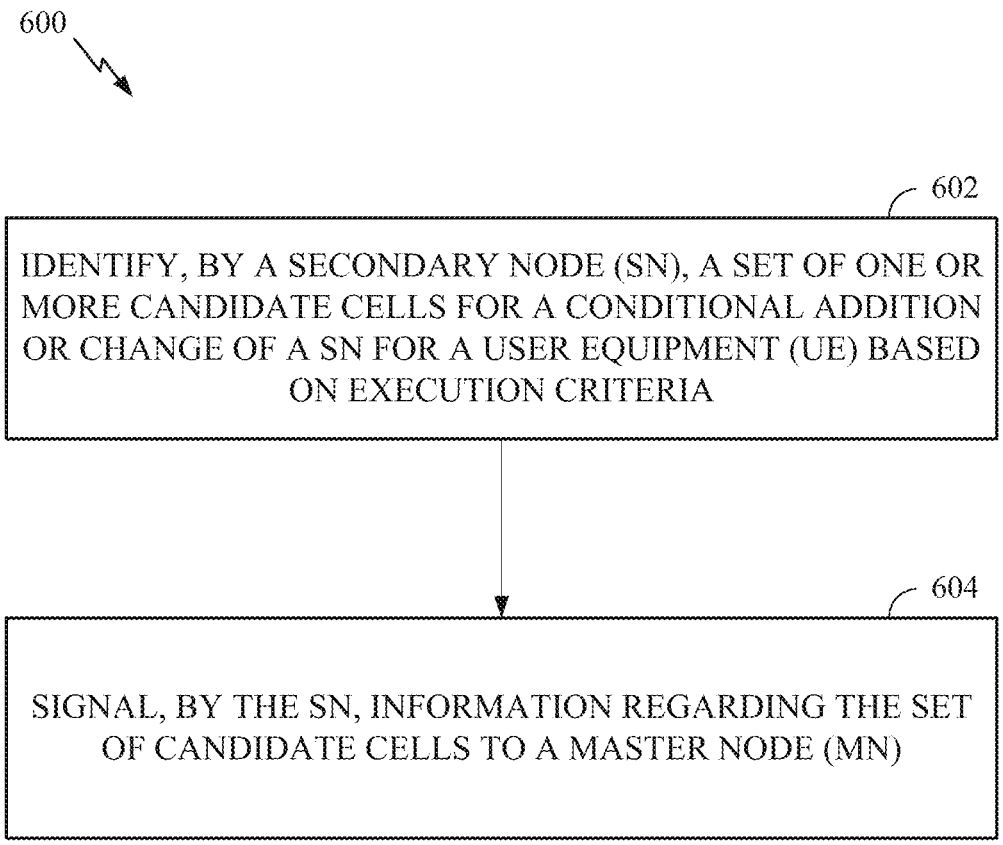
FIG. 6 illustrates example operations for wireless communication by a master node (MN), in accordance with certain aspects of the present disclosure.
Figure 7:
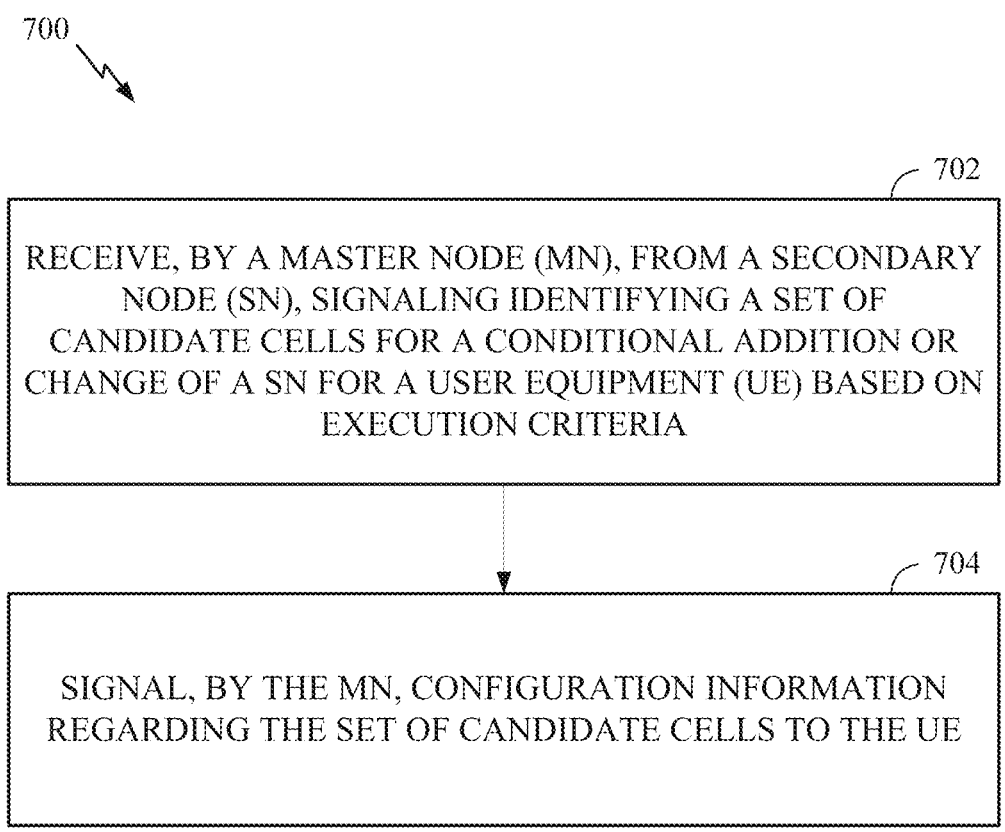
FIG. 7 illustrates example operations for wireless communication by a UE, in accordance with certain aspects of the present disclosure.
Figure 8:
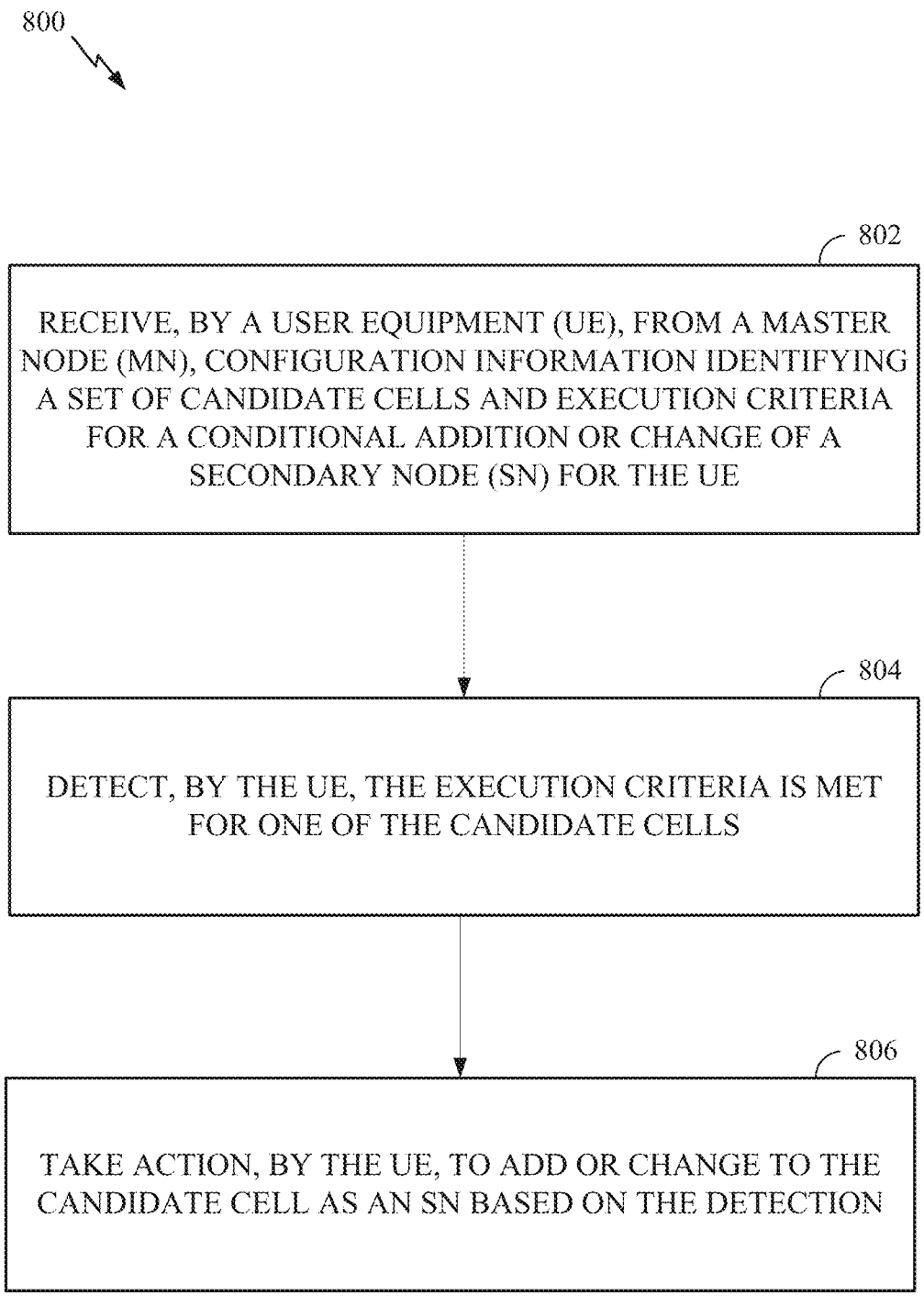
FIG. 8 illustrates example operations for wireless communication by a secondary node (SN), in accordance with certain aspects of the present disclosure.

FIGS. 6, 7, and 8 are flow diagrams that illustrate example operations for an SN-initiated SN change procedure that may be performed by a BS acting as a SN (e.g., a BS of any type illustrated in FIG. 1, 2, or 3), a BS acting as a MN (e.g., a BS of any type illustrated in FIG. 1, 2 or 3), and a UE (e.g., a UE of any type illustrated in FIG. 1 or 3), respectively.

FIG. 6 illustrates example operations 600 that may be performed by a secondary node (SN), in accordance with certain aspects of the present disclosure. Operations 600 may be performed, for example, by a BS (e.g., BS 110 shown in FIG. 1, 2, or 3) serving and/or acting as an SN. The operations 600 may be complementary to the operations 700 performed by a MN and/or operations 800 performed by a UE, as discussed with respect to FIGS. 7 and 8 below. Operations 600 may be implemented as software components that are executed and run on one or more processors (e.g., controller/processor 340 of FIG. 3). Further, the transmission and reception of signals by the SN in operations 600 may be enabled, for example, by one or more antennas (e.g., antennas 334 of FIG. 3). In certain aspects, the transmission and/or reception of signals by the SN may be implemented via a bus interface of one or more processors (e.g., controller/processor 340) obtaining and/or outputting signals.

Operations 600 begin, at block 602, by the SN identifying a set of one or more candidate cells for a conditional addition or change of an SN for a UE based on execution criteria. At block 604, the SN signals information regarding the set of candidate cells to a MN.

FIG. 7 illustrates example operations 700 that may be performed by a master node (MN), in accordance with certain aspects of the present disclosure. Operations 700 may be performed, for example, by a BS (e.g., BS 110 shown in FIG. 1, 2, or 3 or one or more of the processors thereof shown in FIG. 3) serving and or acting as a MN The operations 700 may be complementary to the operations 600 performed by a SN and/or operations 800 performed by a UE, as discussed with respect to FIGS. 6 and 8. Operations 700 may be implemented as software components that are executed and run on one or more processors (e.g., controller/processor 340 of FIG. 3). Further, the transmission and reception of signals by the MN in operations 700 may be enabled, for example, by one or more antennas (e.g., antennas 334 of FIG. 3). In certain aspects, the transmission and/or reception of signals by the MN may be implemented via a bus interface of one or more processors (e.g., controller/processor 340) obtaining and/or outputting signals.

Operations 700 may begin, at block 702, by receiving, from a SN, signaling identifying a set of candidate cells for a conditional addition or change of a SN for a UE based on execution criteria. At block 604, the MN signals configuration information regarding the set of candidate cells to the UE.

FIG. 8 illustrates example operations 800 that may be performed by a UE, in accordance with certain aspects of the present disclosure. Operations 800 may be performed, for example, by a UE, such as UE 120 shown in FIGS. 1 and 3 (or one or more of the processors thereof shown in FIG. 3) participating in a procedure with an MN and an SN. The operations 800 may be complementary to the operations 600 performed by a SN and/or operations 700 performed by a MN, as discussed with respect to FIGS. 6 and 7. Operations 800 may be implemented as software components that are executed and run on one or more processors (e.g., controller/processor 380 of FIG. 3). Further, the transmission and reception of signals by the UE in operations 800 may be enabled, for example, by one or more antennas (e.g., antennas 352 of FIG. 3). In certain aspects, the transmission and/or reception of signals by the UE may be implemented via a bus interface of one or more processors (e.g., controller/processor 380) obtaining and/or outputting signals.

Operations 800 begin, at block 802, by the UE receiving configuration information, from a MN, identifying a set of candidate cells for a conditional addition or change of a SN for a UE based on execution criteria. At block 804, the UE detects the execution criteria is met for one of the candidate cells. At block 806, the UE takes action to add or change to the candidate cell as an SN based on the detection.

As discussed above, the UE 120 may be configured with conditional PSCell execution criteria for SN addition and change procedures. The measurement events used to trigger a PSCell addition and/or a PSCell change may differ based on the type of dual connectivity architecture. Moreover, measurement events may be independently configured by the MN 110a and the SN. Thus, the conditional PSCell addition/change RRC message has to support configuring separate execution criteria configuration for each PSCell of a plurality of PSCells to allow the UE 120 to perform PSCell addition and/or PSCell change.

For conditional PSCell addition and/or change, various options exist for supporting SN initiated SN change. In some aspects, for SN changes triggered by the SN, the SN may identify a set of one or more PSCells which may be configured as candidate cells while the MN determines the execution criteria for the candidate cells. In some aspects, for SN changes triggered by the SN, the SN may both identify a set of one or more PSCells which may be configured as candidate cells and determine the execution criteria for the candidate cells.

Figure 9:
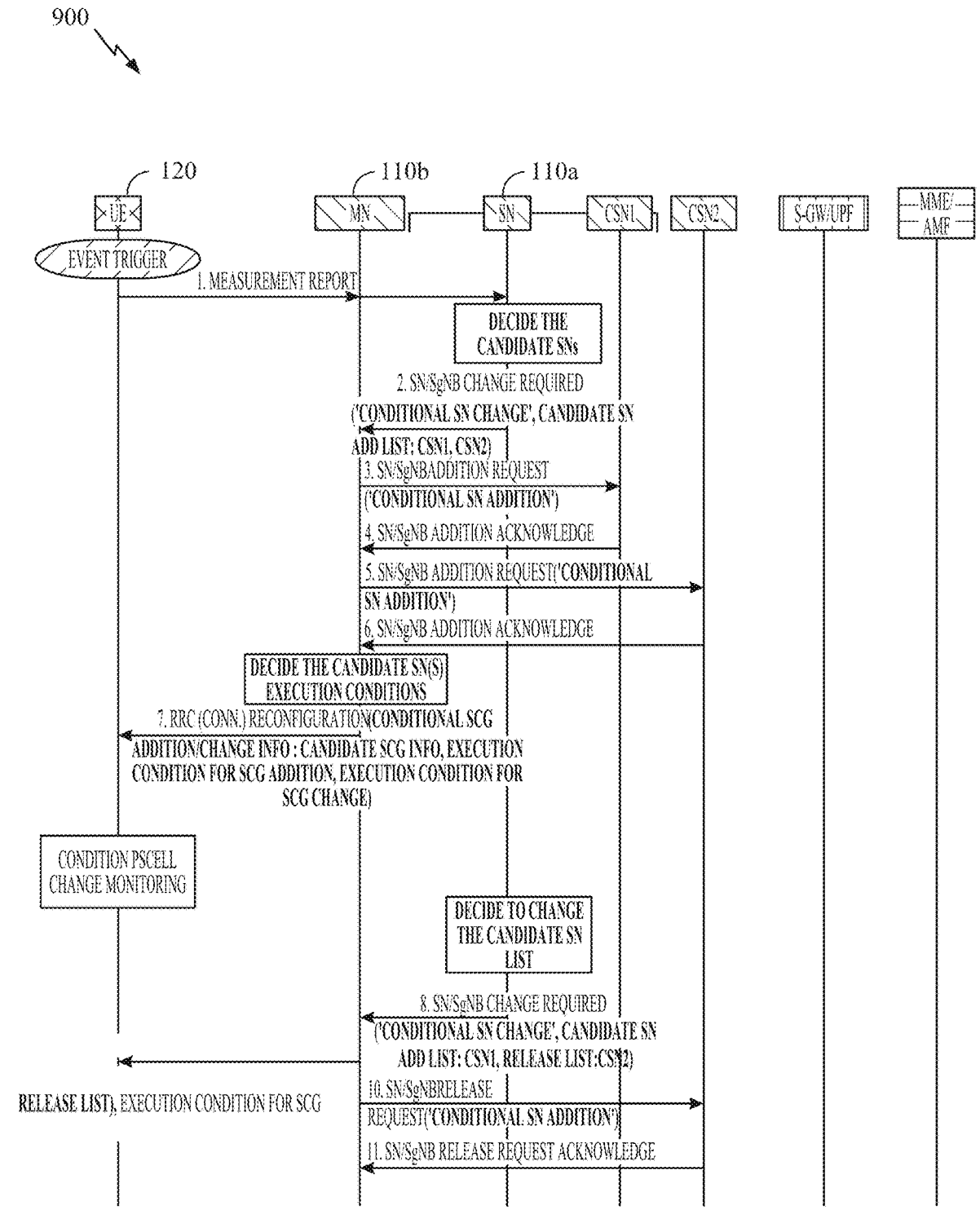
FIG. 9 illustrates a first call flow diagram illustrating example communications between a UE, a MN, and a SN, in accordance with various aspects of the present disclosure.

FIG. 9 illustrates a first call flow 900 diagram illustrating example communications between a UE, a MN, and a SN, in accordance with various aspects of the present disclosure. As shown in the first option illustrated by FIG. 9, the SN may identify a set of one or more PSCells which may be configured as candidate cells while the MN determines the execution criteria for the candidate cells. Upon determination of a triggering event, the UE 120 may determine to fallback to communication with the SN 110a (e.g., BS 110a of FIG. 1). For example, a triggering event may include detecting, by the UE 120, a HO failure (e.g., T304 expiry) or a radio link failure (RLF) on an SN connection while the UE 120 is still connected to the SN 110a (e.g., the source cell is active). In this example, the UE 120 may declare RLF on the SN connection and operate using the existing SN 110a connection, but refrain from triggering radio resource control (RRC) reestablishment.

Before and during the triggering event, the UE 120 may monitor neighboring cells. In the example of FIG. 9, the neighboring cells may include a first candidate secondary node (CSN1) and a second candidate secondary node (CSN2) (e.g., BS 110c and BS 110d, respectively). In response to the triggering event, the UE 120 may transmit, at step 1, to the MN 110b, configured for measurements, a measurement report identifying the CSN1 and CSN2. Subsequently, MN 110b may forward the measurement report to SN 110a. The measurement report may be generated by the UE 120, and may indicate to the MN 110b and SN 110a that the UE 120 is requesting a CHO to a new or additional SN.

Based on the received measurement report, the SN may decide which of the candidate cells to configure as a new PSCell for the UE 120 (e.g., CSN1 and CSN2, in this example). After identifying a set of candidate cells for a SN list, the SN 110a may initiate a conditional SN change by sending to MN 110b, at step 2, in an XN message, a candidate SN add list which includes both CSN1 and CSN2.

As illustrated, the MN 110b may perform the SN addition procedure with the candidate SNs. At step 3, MN 110b may transmit a first conditional SN addition message (e.g., SN addition request to CSN1) to initiate a first conditional SN addition procedure with CSN1. At step 4, MN 110b may receive an SN addition acknowledgement transmitted by CSN1.

At step 5, MN 110b may transmit a second conditional SN addition message (e.g., SN addition request to CSN2) to initiate a second conditional SN addition procedure with CSN2. At step 6, MN 110b may receive an SN addition acknowledgement transmitted by CSN2.

The MN 110b may also determine the execution criteria for each candidate SN, wherein the execution criteria provides the criteria by which execution of the addition or change (e.g., HO) of a particular one of CSN1 110b or CSN2 110c is to be performed.

In certain aspects, the UE 120, MN 110b, and SN 110a may support use of A3/A5 event execution criteria for conditional NR PSCell addition execution condition.

At step 7, the MN 100b may transmit the execution conditions (e.g. execution criteria) and the candidate SN list to the UE 120 in an RRC configuration message (e.g., "RRC Reconfiguration message" for NR) to the UE 120. In some examples, the RRC configuration message may configure the UE 120 for multiple candidate SNs in a single message. For example, the RRC configuration message may include configuration information for both CSN1 and. In some examples the RRC configuration message may include one or more of: (i) source cell RRC configuration changes (if any), (ii) conditional SN addition or change execution criteria for each candidate cell in the set (configured by MN 110b), and/or (iii) RRC reconfiguration for each CSN.

Following receipt of the RRC configuration message, the UE 120 may monitor for conditions to change PSCell, based on the configuration received from the MN.

For example, the UE 120 may determine whether the quality of a neighbor cell is greater than a threshold of an execution criteria that MN 110b sent to the UE 120. If the UE 120 determines that the quality is greater than the threshold, then the execution criteria is met. For CHO, instead of the UE 120 sending the measurement report to the MN 110b (which may be forwarded to the SN 110a), the UE may determine that the execution criteria (e.g., the B1 event criteria or A3/A5 event criteria) for the candidate PSCell is met, and the UE 120 may perform the handover to the candidate PSCell.

As illustrated, should the SN 110a decide to change the candidate SN list, the SN 110a, may initiate another conditional SN change by sending to MN 110b, at step 8, in an Xn message, a new candidate SN add list. Because UE 120 channel conditions are constantly changing, the UE 120 may send subsequent measurements reports after a certain time. The new measurement reports (for example, a measurement report sent at time t2) may be different than the measurement report sent at step 1 (i.e., the measurement report sent at time t1). Thus, the new measurement report may indicate to the SN that certain candidate cells may no longer be suitable for the candidate SN list.

In some examples, as illustrated in FIG. 9, the SN 110a may decide to release CSN2 and include only CSN1 in the SN add list. Thus, at step 9, MN 110b may transmit the candidate add/release list to the UE 120. Further, MN 110b may perform an SN release procedure with CSN2, at steps 10 and 11.

Figure 10:
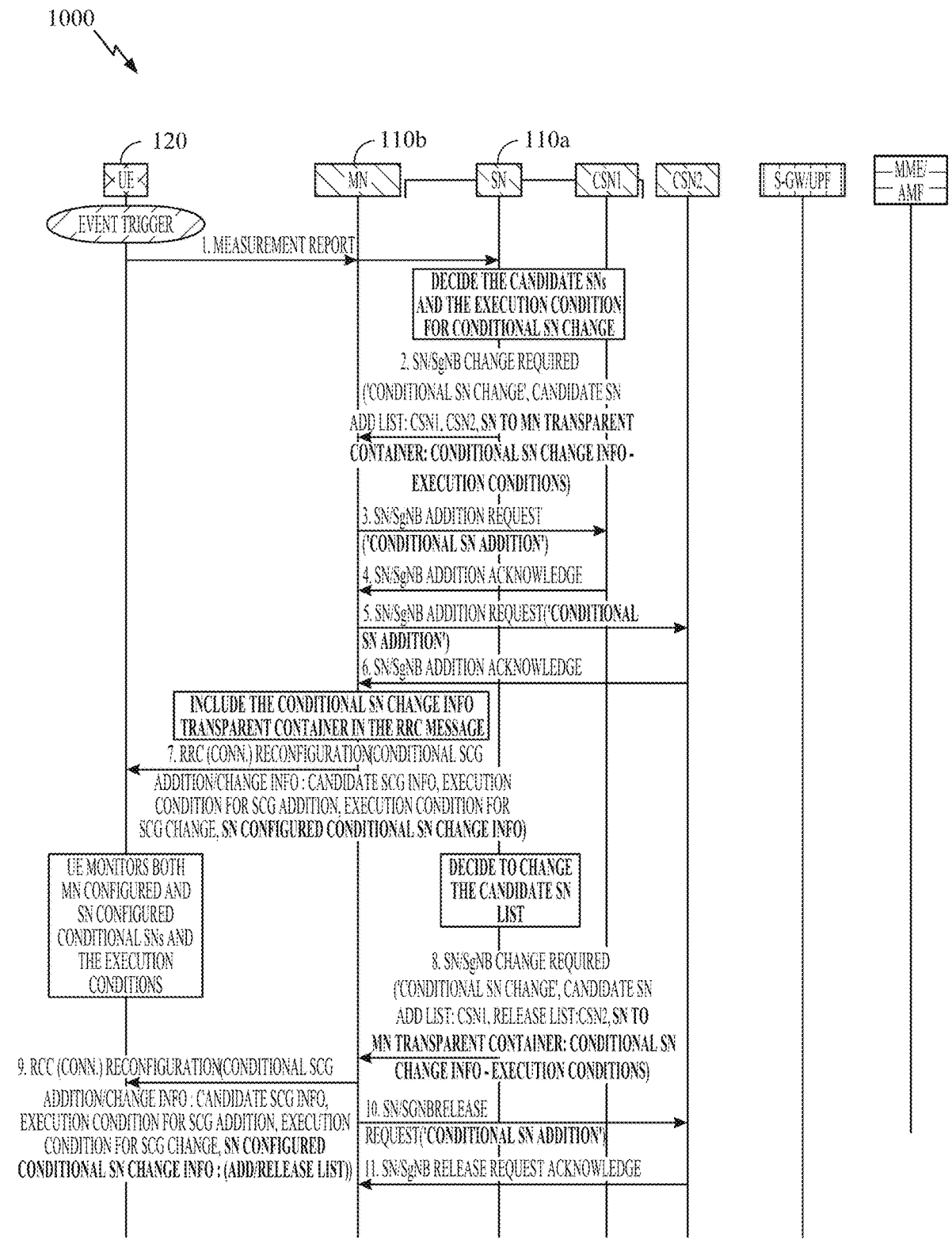
FIG. 10 illustrates a second call flow diagram illustrating example communications between a UE, a MN, and a SN, in accordance with various aspects of the present disclosure.

FIG. 10 illustrates a second call flow diagram 1000 illustrating example communications between a UE, a MN, and a SN, in accordance with various aspects of the present disclosure. As shown in the first option illustrated by FIG. 9, the SN may both identify a set of one or more PSCells which may be configured as candidate cells and determine the execution criteria for the candidate cells.

Similar to FIG. 9, a triggering event (e.g., a HO failure or a RLF) may cause the UE 120 to transmit, at step 1, to the MN 110b configured for measurements, a measurement report identifying the CSN1 and CSN2, which the MN 110b may forward to the SN 110a. The SN 110a may select the candidate cells (again CSN1 and CSN2), based on the measurement report, for the candidate SN list. Again, at step 2, the SN 110a may transmit the candidate SN list, in the Xn message, to the MN 110b, such that the MN 110b may perform SN addition procedures (at steps 3-6).

Unlike the example shown in FIG. 9, the SN 110a in FIG. 10 may also determine execution criteria for the candidate cells and signal information regarding the execution criteria to the MN 110b. The MN 110b may include the execution criteria in the RRC Reconfiguration message sent to the UE 120, at step 7. Various options for sending the execution criteria from the SN 110a to the MN 110b may exist.

In some examples, the RRC message may include the execution criteria configuration for each candidate cell in a transparent container. In some examples, the RRC message may include RRC reconfiguration for each candidate cell in the set in a transparent container.

In some examples, according to a first option, the MN 110b may be allowed to modify the execution criteria in the Xn message from the SN 110a to the MN 110b. Thus, the RRC message transmitted by the MN 110b to the UE 120 may signal information regarding the candidate cells and the modified execution criteria (similar to the option shown in FIG. 9).

In some examples, according to a second option, as illustrated in step 2 of FIG. 10, the SN 110a may include the conditional SN change execution criteria in an SN to MN transparent container, such that MN 110b may alter it. In this case, the MN 110b may only forward the container to the UE (without modification) in the SN defined execution criteria and the candidate SN reconfiguration in the RRC reconfiguration message sent by MN 110b to the UE 120.

In some examples where the UE is configured with conditional SN change configurations from both the MN 110b and SN 110a, the UE 120 may monitor both configurations independently Accordingly, the UE 120 may trigger an SN change when any of the MN defined or SN defined execution criterias are met (e.g., based on the first occurred condition).

In some aspects, after executing an SN change to a new SN (e.g., CSN1 or CSN2), the UE 120 may stop monitoring the execution conditions (e.g., criteria) configured by the old SN 110a. In such cases, the UE 120 may notify the MN 110b about the change of SN (e.g., via an RRC reconfiguration complete message). In response, the MN 110b may clean up the old SN selected candidate SN configuration. For example, MN 110b may delete old candidate cells if they are no longer suitable as candidate SNs.

Figure 11:
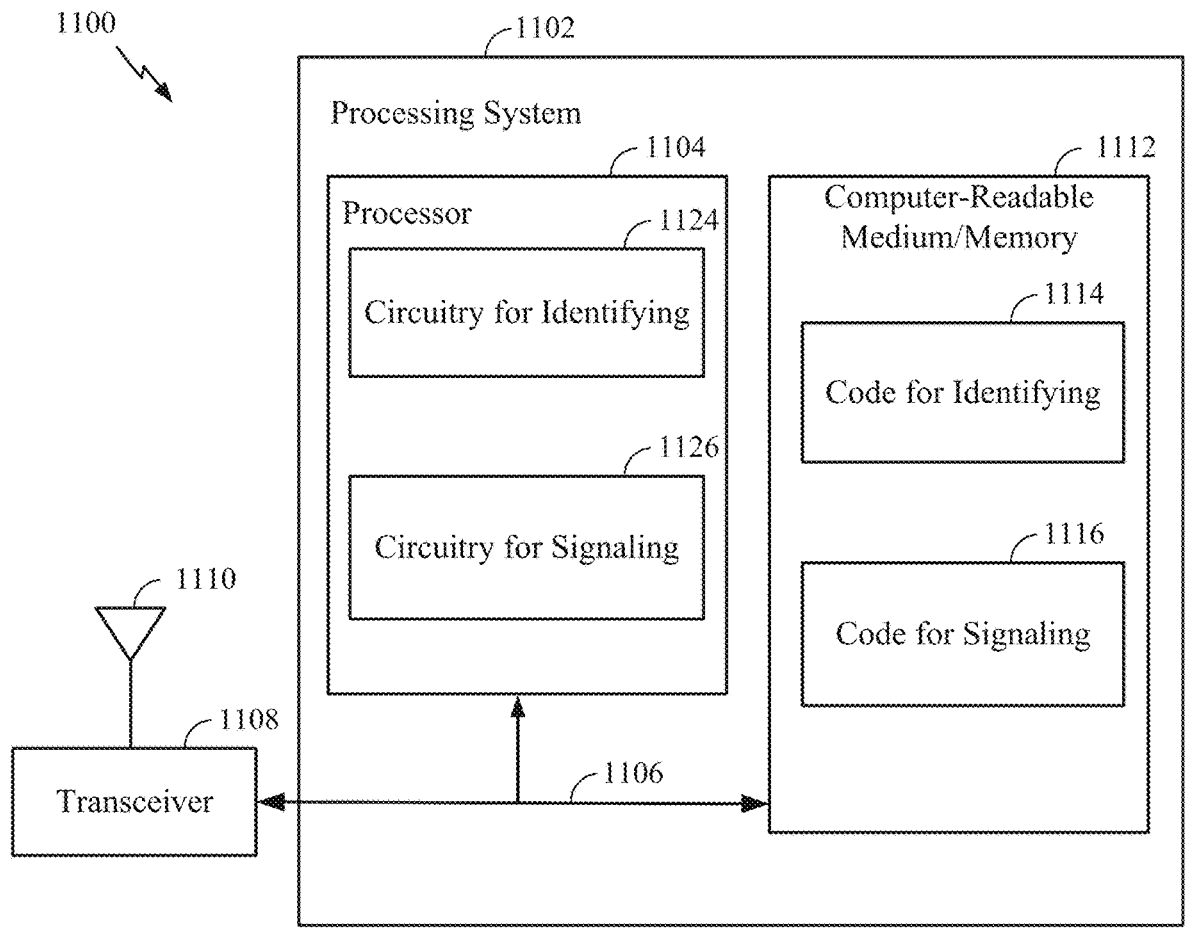
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein. In certain aspects, computer-readable medium/memory 1112 stores code 1114 for identifying (e.g., for identifying a set of one or more candidate cells for a conditional addition or change of an SN for a UE based on execution criteria) and code 1116 for signaling (e.g., for signaling information regarding the set of candidate cells to a MN). In certain aspects, the processor 1104 has circuitry configured to implement the code stored in the computer-readable medium/memory 1112. The processor 1104 includes circuitry 1124 for identifying (e.g., for identifying a set of one or more candidate cells for a conditional addition or change of an SN for a UE based on execution criteria) and circuitry 1126 for signaling (e.g., for signaling information regarding the set of candidate cells to a MN).

Figure 12:
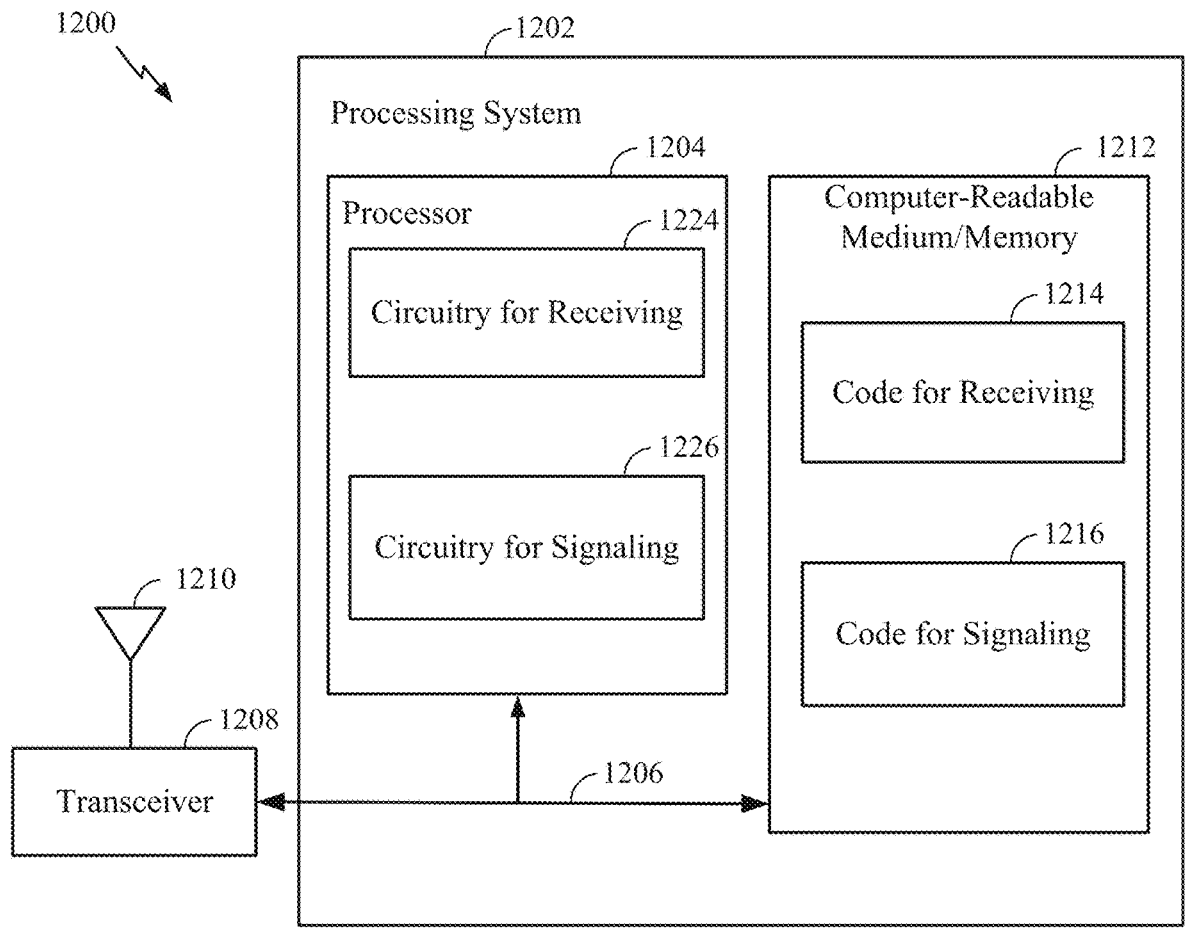
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7, or other operations for performing the various techniques discussed herein. In certain aspects, computer-readable medium/memory 1212 stores code 1214 for receiving (e.g., for receiving, from a SN, signaling identifying a set of candidate cells for a conditional addition or change of a SN for a UE based on execution criteria and code 1216 for signaling (e.g., for signaling configuration information regarding the set of candidate cells to the UE). In certain aspects, the processor 1204 has circuitry configured to implement the code stored in the computer-readable medium/memory 1212. The processor 1204 includes circuitry 1224 for receiving (e.g., for receiving, from a SN, signaling identifying a set of candidate cells for a conditional addition or change of a SN for a UE based on execution criteria and circuitry 1226 for signaling (e.g., for signaling configuration information regarding the set of candidate cells to the UE).

Figure 13:
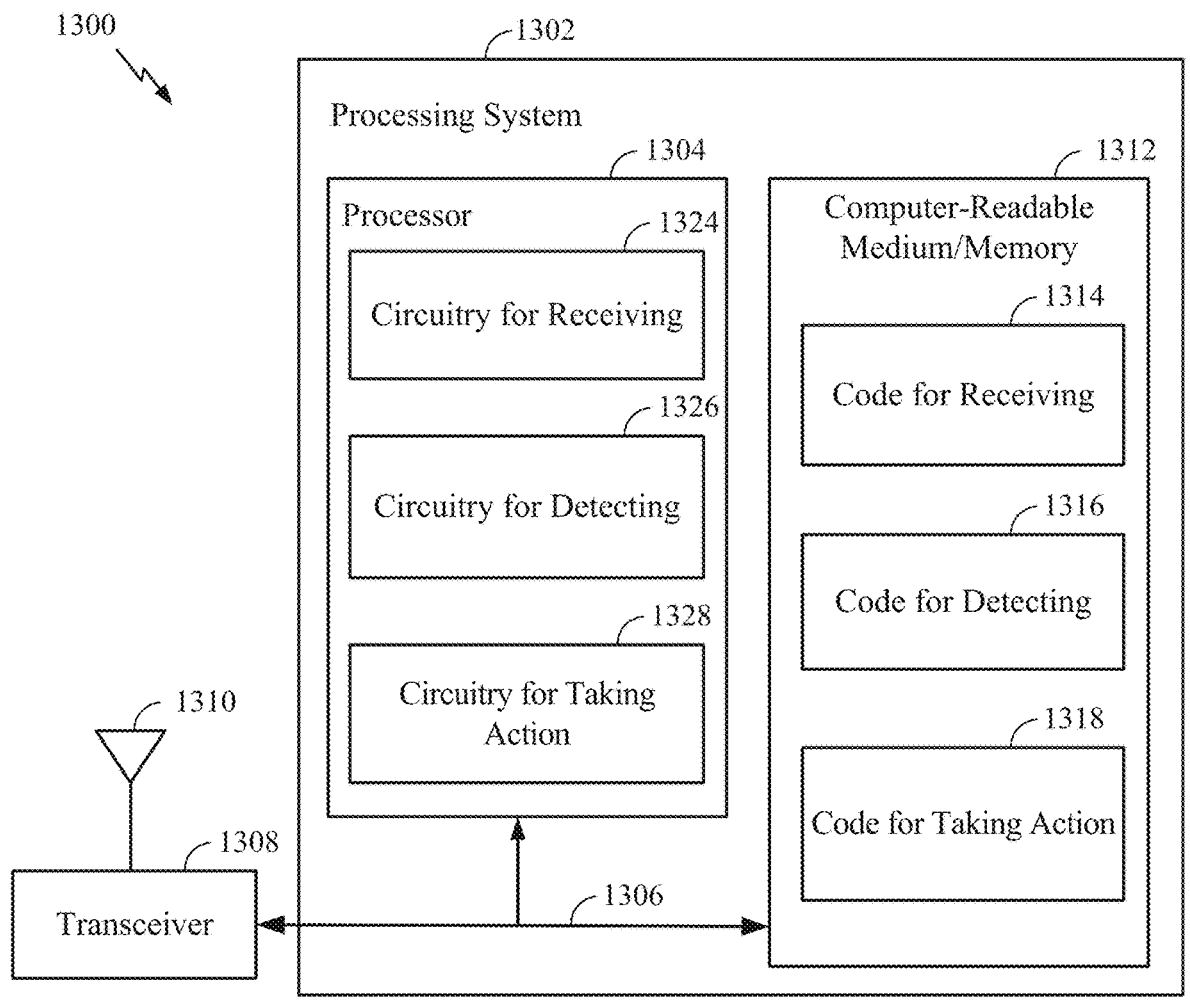
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8, or other operations for performing the various techniques discussed herein. In certain aspects, computer-readable medium/memory 1312 stores code 1314 for receiving (e.g., for receiving, from a MN, configuration information identifying a set of candidate cells for a conditional addition or change of a SN for the UE based on execution criteria), code 1316 for detecting (e.g., for detecting the execution criteria is met for one of the candidate cells), and code 1318 for taking action (e.g., for taking action to add or change to the candidate cell as an SN based on the detection). In certain aspects, the processor 1304 has circuitry configured to implement the code stored in the computer-readable medium/memory 1312. The processor 1304 includes circuitry 1324 for receiving (e.g., for receiving, from a MN, configuration information identifying a set of candidate cells for a conditional addition or change of a SN for the UE based on execution criteria), circuitry 1326 for detecting (e.g., for detecting the execution criteria is met for one of the candidate cells), and circuitry 1328 for taking action (e.g., for taking action to add or change to the candidate cell as an SN based on the detection).

Example Aspects

Aspect 1. A method for wireless communications by a user equipment (UE), comprising receiving, from a master node (MN), configuration information identifying a set of candidate cells and execution criteria for a conditional addition or change of a secondary node (SN) for the UE, detecting the execution criteria is met for one of the candidate cells, and taking action to add or change to the candidate cell as an SN based on the detection.

Aspect 2. The method of Aspect 1, wherein the configuration information is received by the UE in a radio resource control (RRC) message.

Aspect 3. The method of Aspect 2, wherein the RRC message includes at least one of the following information for conditional addition or change of an SN: source cell RRC configuration changes, conditional SN addition or change execution criteria configuration for each candidate cell in the set, or RRC reconfiguration for each candidate cell in the set.

Aspect 4. The method of Aspect 3, wherein the RRC message includes the execution criteria configuration for each candidate cell in a transparent container.

Aspect 5. The method of any of Aspects 1-4, further comprising sending a radio resource control (RRC) message to the MN indicating when the conditional SN addition or change execution criterial is met for a selected one of the candidate cells in the set if a configuration of the selected cell is valid.

Aspect 6. The method of any of Aspects 1-5, wherein the configuration information indicates first configuration information determined by the MN and second configuration information determined by a SN, the UE monitors execution criteria according to the first and second configurations independently, and executes an SN change to a candidate cell when any of the execution criteria according to the first or second configurations is met.

Aspect 7. The method of Aspect 6, wherein the UE stops monitoring the execution criteria determined by the old SN after executing the SN change to the candidate cell.

Aspect 8. The method of Aspect 6 or 7, further comprising sending a notification to the MN indicating that the SN change to a candidate cell has been executed.

Aspect 9. The method of Aspect 8, wherein the notification is sent via a radio resource control (RRC) reconfiguration complete message.

Aspect 10. A method for wireless communications by a secondary node (SN), comprising identifying a set of one or more candidate cells for a conditional addition or change of a SN for a user equipment (UE) based on execution criteria and signaling information regarding the set of candidate cells to a master node (MN).

Aspect 11. The method of Aspect 10, wherein the information regarding the set of candidate cells is signaled to the MN via a message without execution criteria and the MN determines the execution criteria for the candidate cells and signals the candidate cells and execution criteria to the UE.

Aspect 12. The method of Aspect 10 or 11, further comprising determining execution criteria for the candidate cells and signaling information regarding the execution criteria to the MN.

Aspect 13. The method of Aspect 12, wherein the MN is allowed to modify the execution criteria for the candidate cells and signal the information regarding the candidate cells and modified execution criteria to the UE.

Aspect 14. The method of Aspect 12 or 13, wherein the SN signals the information regarding the execution criteria to the MN to be forwarded to the UE without modification.

Aspect 15. The method of Aspect 14, wherein the SN signals the information regarding the execution criteria in a transparent container and the MN forwards the transparent container to the UE.

Aspect 16. The method of any of Aspects 10-15, further comprising deciding to change the set of one or more candidate cells and signaling information regarding the change to the MN.

Aspect 17. A method for wireless communications by a master node (MN), comprising receiving, from a secondary node (SN), signaling identifying a set of candidate cells for a conditional addition or change of a SN for a user equipment (UE) based on execution criteria and signaling configuration information regarding the set of candidate cells to the UE.

Aspect 18. The method of Aspect 17, wherein the MN receives the information regarding the set of candidate cells from the SN via a message without execution criteria; and the MN determines the execution criteria for the candidate cells and signals the candidate cells and execution criteria to the UE.

Aspect 19. The method of Aspect 17 or 18, further comprising receiving information from the SN regarding execution criteria for the candidate cells.

Aspect 20. The method of Aspect 19, further comprising modifying the execution criteria for the candidate cells and signaling information regarding the candidate cells and the modified execution criteria to the UE.

Aspect 21. The method of Aspect 20, wherein the SN signals the information regarding the execution criteria to the MN to be forwarded to the UE without modification and the MN forwards the information regarding the execution criteria to the SN without modification.

Aspect 22. The method of Aspect 21, wherein the SN signals the information regarding the execution criteria in a transparent container and the MN forwards the transparent container to the UE.

Aspect 23. The method of any of Aspects 17-22, further comprising performing an SN addition procedure with the candidate cells.

Aspect 24. The method of any of Aspects 17-23, wherein the configuration information is signaled to the UE in a radio resource control (RRC) message.

Aspect 25. The method of any of Aspects 17-24, further comprising receiving a radio resource control (RRC) message from the UE indicating when the conditional SN addition or change execution criterial is met for a selected one of the candidate cells in the set if a configuration of the selected cell is valid.

Aspect 26. The method of any of Aspects 17-25, wherein the configuration information is signaled to the UE in a radio resource control (RRC) message that includes separate execution criteria for conditional SN addition and SN change.

Aspect 27. The method of any of Aspects 17-26, further comprising receiving notification from the UE about a change of SN via a radio resource control (RRC) Reconfiguration complete message and updating a candidate SN configuration to remove cells that are no longer suitable candidate cells for conditional addition or change as an SN.

Aspect 28. An apparatus for wireless communication by a user equipment (UE), comprising a memory and at least one processor coupled to the memory, the least one processor being configured to receive, from a master node (MN), configuration information identifying a set of candidate cells for a conditional addition or change of a secondary node (SN) for the UE based on execution criteria, detect the execution criteria is met for one of the candidate cells, and take action to add or change to the candidate cell as an SN based on the detection.

Aspect 29. An apparatus for wireless communication by a secondary node (SN), comprising a memory and at least one processor coupled to the memory, the least one processor being configured to identify a set of one or more candidate cells for a conditional addition or change of a SN for a user equipment (UE) based on execution criteria and signal information regarding the set of candidate cells to a master node (MN).

Aspect 30. An apparatus for wireless communication by a master node (MN), comprising a memory and at least one processor coupled to the memory, the least one processor being configured to receive, from a secondary node (SN), signaling identifying a set of candidate cells for a conditional addition or change of a SN for a user equipment (UE) based on execution criteria and signal configuration information regarding the set of candidate cells to the UE.

ADDITIONAL CONSIDERATIONS

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized. It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:

receiving, from a master node (MN), configuration information identifying a set of candidate cells and execution criteria for a conditional addition or change of a secondary node (SN) for the UE, wherein the configuration information indicates first configuration information determined by the MN and second configuration information determined by an SN;

monitoring execution criteria according to the first and second configurations independently;

detecting the execution criteria is met for one candidate cell of the set of candidate cells according to the first configuration information or the second configuration information; and
executing an SN change to the one candidate cell based on the detection.

2. The method of claim 1, wherein:
the configuration information is received by the UE in a radio resource control (RRC) message.

3. The method of claim 2, wherein the RRC message includes at least one of the following information for conditional change of an SN:
source cell RRC configuration changes;
conditional SN change execution criteria configuration for each candidate cell in the set; or
RRC reconfiguration for each candidate cell in the set.

4. The method of claim 1, further comprising sending a radio resource control (RRC) message to the MN indicating when the conditional SN change execution criteria is met for a selected one of the candidate cells in the set if a configuration of the selected one of the candidate cells is valid.

5. The method of claim 1, wherein the UE stops monitoring the execution criteria determined by the old SN after executing the SN change to the one candidate cell.

6. The method of claim 1, further comprising sending a notification to the MN indicating that the SN change to the one candidate cell has been executed.

7. The method of claim 6, wherein the notification is sent via a radio resource control (RRC) reconfiguration complete message.

8. A method for wireless communications by a master node (MN), comprising:
receiving, from a secondary node (SN), signaling identifying a set of candidate cells for a conditional addition or change of a SN for a user equipment (UE) based on execution criteria and the execution criteria;
modifying the execution criteria for the set of candidate cells; and
signaling configuration information regarding the set of candidate cells and the modified execution criteria to the UE.

9. The method of claim 8, further comprising performing an SN addition procedure with the candidate cells.

10. The method of claim 8, wherein the configuration information is signaled to the UE in a radio resource control (RRC) message.

11. The method of claim 8, further comprising receiving a radio resource control (RRC) message from the UE indicating when the execution criteria for the conditional addition or change of the SN is met for a selected one of the candidate cells in the set if a configuration of the selected one of the candidate cells is valid.

12. The method of claim 8, wherein the configuration information is signaled to the UE in a radio resource control (RRC) message that includes the modified execution criteria for conditional SN addition and SN change.

13. The method of claim 8, further comprising:
receiving notification from the UE about a change of SN via a radio resource control (RRC) reconfiguration complete message; and
updating a candidate SN configuration to remove cells that are no longer suitable candidate cells for conditional addition or change as an SN.

14. An apparatus for wireless communication by a user equipment (UE), comprising:
a memory; and
at least one processor coupled to the memory, the least one processor being configured to:
receive, from a master node (MN), configuration information identifying a set of candidate cells and execution criteria for a conditional addition or change of a secondary node (SN) for the UE, wherein the configuration information indicates first configuration information determined by the MN and second configuration information determined by an SN;
detect the execution criteria is met for one candidate cell of the set of candidate cells according to the first configuration information or the second configuration information; and
execute an SN change to the one candidate cell based on the detection.

15. An apparatus for wireless communication by a master node (MN), comprising:
a memory; and
at least one processor coupled to the memory, the least one processor being configured to:
receive, from a secondary node (SN), signaling identifying a set of candidate cells for a conditional addition or change of a SN for a user equipment (UE) based on execution criteria and the execution criteria;
modify the execution criteria for the set of candidate cells; and
signal configuration information regarding the set of candidate cells and the modified execution criteria to the UE.

* * * * *